9221X
I. Sutherland,
Fire Place.
Patented Oct. 31. 1835.
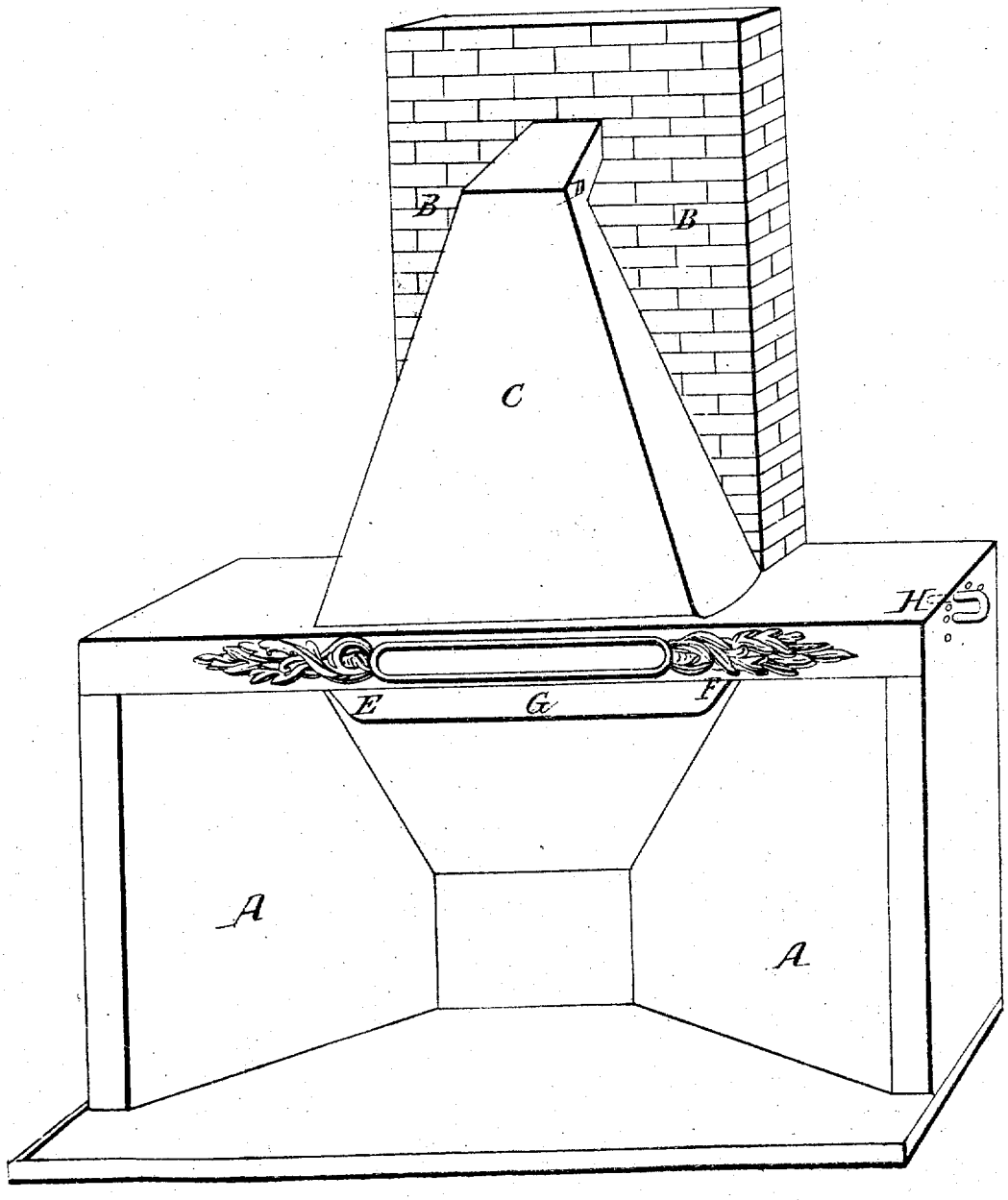

9231x Daniel Sutherland, of Lisbon, Maine

Letters Patent

The Schedule referred to in these Letters Patent and making part of the same containing a description in the words of the said Daniel Sutherland of his improvement in the open Stove or fire place —

To all to whom these presents shall come: Be it known that I. Daniel Sutherland of Lisbon, in the County of Lincoln, and State of Maine, have invented a new & useful improvement in the construction of open stoves & fire places for warming buildings, and that the following is a full and exact description thereof to wit — The fire place may be constructed of any material commonly used for that purpose or that will withstand heat — that is to say of sheet iron, cast iron, stone or brick — and of any size or shape suited to the room or building to be warmed and with jams hollow or solid as may suit the builder — and with a flue or passage for smoke up or into the chimney in the usual manner — another flue or passage for smoke is made in the top of the stove or fire place and opens into the chimney at any point above the connection or opening of the first named flue or passage for smoke, which may be desired by the builder and is to be of a size proportioned to the size of the fire place or stove to be constructed. For a more particular designation of the parts above described reference is made to the drawings hereunto annexed; wherein the part marked A. represents the jam or sides of the stove or fire place. B. represents the exterior side of the chimney within which the first named flue passes and C. represents the second named flue and D. represents the junction of the latter flue with the former. Across the throat of the flues from the points marked E & F. on the accompanying drawing is a valve or shutter to be constructed of sheet iron, or cast iron, hung upon a rod of iron or wire extending across the width of the stove or fire place between the two flues — one end of said rod or wire is inserted into one side of the stove or fire place and passes through the opposite side far enough to be converted into a handle, with one end thereof crooked into a parallel with the main rod & to pass again into the side of the stove. The valve or shutter being hung to said rod or wire is to be in width 16 9221X equal to the width of the respective flues and is turned by the handle of said iron either upwards so that the same shall close up the last mentioned flue or downwards so as to close up the first named flue, or to an intermediate point so as to leave both flues open as may be desired. The part marked G. on the accompanying drawing represents said valve, and H. represents the handle & crook of said rod or wire. Said valve is confined either upon the upper or lower flue or at any intermediate point between said flues by entering the said rod or wire at its inverted end into the side of the stove or fire place for which various holes are made in the fire place or stove side, in the line of the circle described by handle of said rod or wire, as said valve is turned upwards or downwards. The benefit of said valve or shutter consists in stopping at pleasure either of said flues and particularly in graduating the heat by either using or disusing the additional flue built upon the top of the stove or fire place. And the benefit of the double flues connected with said valve, is to secure a draft of air through the one when the other shall be deficient & thus to avoid smoke in the room or building to be heated.

What I claim as my own invention and not previously known in the above described fire place or stove is the construction of the second or additional flue or passage for heat & smoke, and the construction and application of the valve to the two flues or smokes - The whole consisting of a fire place or stove with two flues and one valve to shut up either flue at pleasure.

Witnesses
Francis O. J. Smith
Freeman Bradford

Daniel Sutherland (Drawing)

Exd.
M.G.

[832